United States Patent [19]

Bauer et al.

[11] Patent Number: 4,831,722

[45] Date of Patent: May 23, 1989

[54] APPARATUS AND METHOD FOR INSTALLING ELECTRICAL CONNECTORS ON FLAT CONDUCTOR CABLE

[75] Inventors: Alajos Z. Bauer, Norwalk; Michael A. Verespej, Trumbull, both of Conn.

[73] Assignee: Burndy Corporation, Norwalk, Conn.

[21] Appl. No.: 105,466

[22] Filed: Oct. 1, 1987

Related U.S. Application Data

[60] Continuation of Ser. No. 889,554, Jul. 26, 1986, abandoned, which is a division of Ser. No. 716,600, Mar. 27, 1985, Pat. No. 4,630,362, which is a continuation of Ser. No. 314,966, Oct. 26, 1981, abandoned.

[51] Int. Cl.[4] .............................................. B23P 19/04

[52] U.S. Cl. ........................................ 29/751; 29/759; 29/753; 29/761; 29/798; 29/866; 29/243.54; 227/106; 227/43; 227/150

[58] Field of Search ................................ 29/747-751, 29/755, 809, 758, 753, 759, 761, 798, 863, 865, 866, 243.53, 243.54; 339/17 B, 17 F, 17 M; 227/149, 147, 150, 154, 103, 104, 106, 43

[56] References Cited

U.S. PATENT DOCUMENTS

| | | | |
|---|---|---|---|
| 468,734 | 2/1892 | Unbehend | 227/149 |
| 916,026 | 3/1909 | Sasseman | 227/149 |
| 3,553,836 | 1/1971 | Cooies | 29/866 |
| 4,015,328 | 4/1977 | McDonough | 339/17 M |
| 4,066,319 | 1/1978 | Baker et al. | 339/17 F |
| 4,249,304 | 2/1981 | Weinmann et al. | 29/872 |
| 4,255,612 | 3/1981 | Grundfest | 174/117 A |
| 4,490,904 | 1/1985 | Moyher | 29/751 |

FOREIGN PATENT DOCUMENTS

| | | | |
|---|---|---|---|
| 3046182 | 7/1982 | Fed. Rep. of Germany | 29/809 |
| 227335 | 12/1984 | Japan | 29/809 |
| 590067 | 1/1978 | U.S.S.R. | 29/809 |
| 1177275 | 1/1970 | United Kingdom . | |
| 1430650 | 3/1976 | United Kingdom | 29/809 |

*Primary Examiner*—P. W. Echols
*Attorney, Agent, or Firm*—Perman & Green

[57] ABSTRACT

Method for installing rivet-type electrical connectors onto flat conductor cables wherein the connectors are fed to the machine from a magazine, transferred to a press and then pressed onto and through the cable over an anvil which holds the rivet-type connector to form a secure connection with the cable. The resulting profile of the connector is such that it extends through the conductor of the cable and is held thereon by a flange on one side of the cable and an eyelet-type crimp on the opposite side of the cable.

12 Claims, 8 Drawing Sheets

FIG. 16.
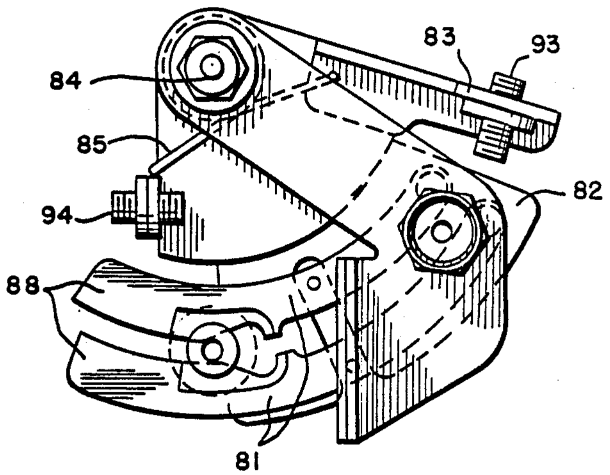
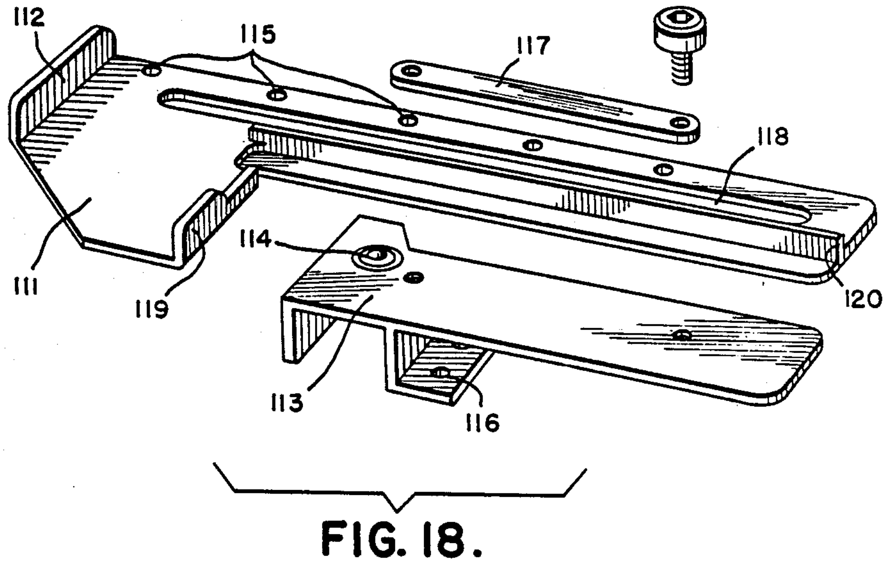
FIG. 18.

APPARATUS AND METHOD FOR INSTALLING ELECTRICAL CONNECTORS ON FLAT CONDUCTOR CABLE

This is a continuation application of Ser. No. 889,554 filed July 25, 1986, now abandoned, which is a divisional application of Ser. No. 716,600 filed Mar. 27, 1985, now U.S. Pat. No. 4,630,362 issued Dec. 23, 1986, which is a continuation application of Ser. No. 314,966 filed Oct. 26, 1981, now abandoned.

BACKGROUND OF THE INVENTION

This invention relates generally to electrical connectors and, more particularly, to a method for installing electrical connectors onto flat conductor cables.

Flat conductor cable has come in to general use in such areas as under-carpet wiring systems. This type of cable carries out the same function as a conventional round wire in distributing electricity to work stations, however, its use does not require underfloor channels, raceways or floor passage holes as does the conventional round wire system. The flat conductor cable is simply laid ount on a flat surface, such as the floor, and then carpeting placed over it. The cable is very thin and its presence is not perceivable after the carpeting has been placed over it. The cable itself has a series of parallel flat conductors individually sealed with by insulating jacket which resists moisture, chemicals, object penetration, heat, etc. The cable can have any desired number of conductors, three, four and five parallel strips being common.

Although installation layout flexibility is maximized with the use of such cables since they can be flexed and folded without delaminating, there has not been any easy and quick method of installing connectors to the cable. The tasks of making cable splices and cable taps are particularly laborious with prior art technology. These types of connections generally require unique and complicated kinds of connectors and, in some cases, a number of other special components.

For instance, in one prior art system, splicing of flat conductor cables is accomplished as follows. First, each conductor run in the cable must be torn back along perforations. Then, a special splice connector must be placed over the conductors. This component has an adhesive thereon and a protective covering must be removed from it. An adhesive ridge is then folded over and placed on the cable. The installer then slides a hand tool under the splice ends to crimp a series of individual connector components on the connector assembly in series fashion. In this type of system, a similarly multistep process is carried out in order to make a cable tap. However, the special connectors that are used for cable splicing cannot be used for cable tapping. Another special connector has to be used for this purpose. Still another special connector must be used for transition fittings. As a result, to install a system having a normal range of requirements, an entire inventory of special connectors having widely different configuratons must be used.

A second prior art connector system for splicing flat cables is also known. In this second system, a stripper plate is placed over the tap/main junction. The stripper plate has a number of notations where holes should be punched depending upon the job to be done. After the installer determines which holes are appropriate for his job, he then must punch selected holes on the stripper plate with a punch and hammer. The stripper plate is then removed and connectors are installed by hand into the punched holes. The connectors have a hood portion on one side of the junction and a nail portion on the other side. The punch is then used again to bend the hood onto the nail and, then, finally a tool is inserted onto the connector to carry out final crimping.

Accordingly, it is an object of the present invention to provide an improved apparatus and method for installing connectors onto flat conductor cable.

It is another object of the invention to provide a portable installation machine for flat cable connectors.

It is another object of the invention to provide an installation method for flat cable connectors which carries out the complete connection process within one machine.

It is a further object of the invention to provide an appartus and method for rapidly installing connectors on flat conductor cables.

It is a further object of the invention to provide apparatus and method for installing connectors on flat conductor cables which are universal to all types of connections including terminal fittings, tap connections, and splice connections.

It is a further object of the invention to provide an apparatus and method for installing mechanically strong connectons to flat conductor cables.

It is a further object of the invention to provide a machine for installing connectors to flat conductor cable which has full cycle insurance.

It is a further object of the invention to provide an apparatus and method for installing connectors to flat conductor cable which form a reliable, repeatable connection every time.

SUMMARY OF THE INVENTION

Briefly state, and in accordance with the present invention, there is provided a method and apparatus for installing connectors onto flat conductor cables. The connectors are delivered one at a time from a supply of connectors and transferred to an installation station. The flat conductor cable is placed in a position wherein the portion to which the connector is to be attached lies in the installation station. The connector is aligned with the cable and then pressed into and through the conductor portion of the cable to form an electrical connection therewith.

BRIEF DESCRIPTION OF THE DRAWINGS

FIG. 16 is the same mechanism shown in FIG. 14 with the mechanism partially returned to the position to which it is biased with its jaws partially closed.

FIG. 18 is an exploded perspective view of the locator assembly.

While the present invention is herein described in connection with a preferred embodiment and associated method of use thereof, it should be understood that it is not intended to limit the invention to this embodiment and method of use. On the contrary, it is intended to cover all alternatives, modifications and equivalents as may be included within the spirit and scope of the invention as defined by the appended claims.

DETAILED DESCRIPTION OF THE INVENTION

Figure 1A:
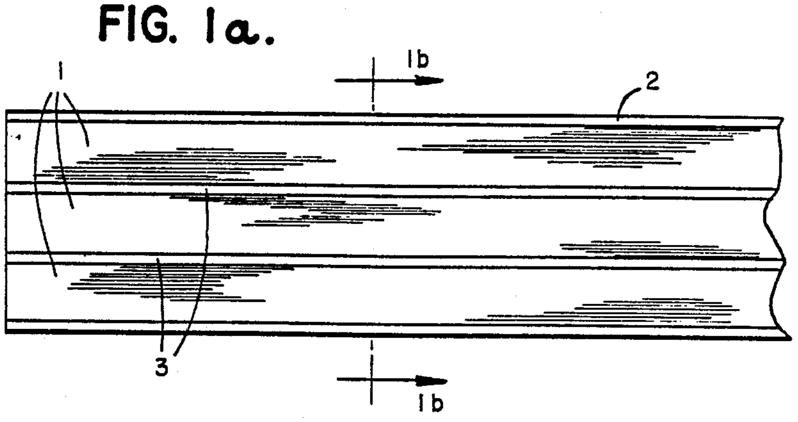
FIG. 1*a* is a top view of a typical flat conductor cable.
Figure 1B:
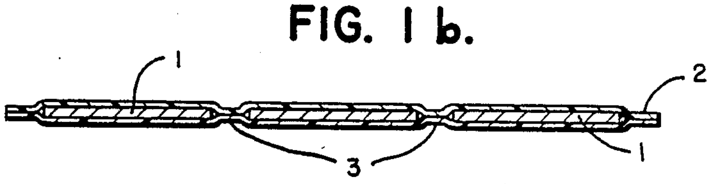
FIG. 1*b* is a front cross-section of the cable in FIG. 1*a*.

Referring more particularly to the drawings, wherein like referenced numerals have been used to the extent practical to designate like elements, FIGS. 1*a* and 1*b* illustrate an example of a flat conductor cable. This is the cable onto which the connectors are to be installed. Thin strips of conducting material 1, such as copper, are embedded in, or adheringly surrounded by a thin sleeve 2, or jacket, made of any insulating plastic material, for example, polyester. The metal strips 1 are separated and insulated from each other by spacings 3 at the edges of the cable and between the metal strips. The top and bottom plastic portions of the sleeve are simply bonded to each other at these points.

FIG. 1*b* is an illustration of the cross-section of such a cable with the thicknesses of the components exaggerated for easier illustration. An example of a three-strip flat conductor cable is type FCC 12 AWG, 300 volt, 20 amp copper cable sold by Burndy Corporation, Norwalk, Conn., having catalog number PC12-3BLKC. The dimensional thickness of this specific cable is approximately 0.015 inches at the conductor strip, however, this thickness can be varied depending upon application and the manufacturing process. The connection arrangement and procedure of installation of the connector is not in any way limited to any specific gauge or thickness of conductor cable.

Figure 2A:
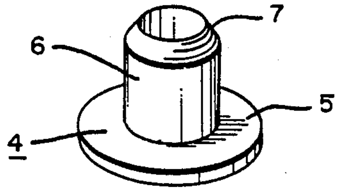
FIG. 2*a* is a perspective view of a preferred embodiment of the rivet connecting element.
Figure 2B:
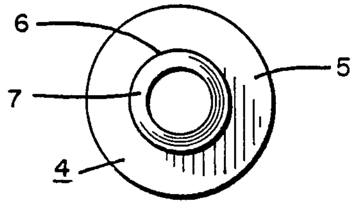
FIG. 2*b* is a top view of the connector in FIG. 2*a* looking towards the flange portion thereof.

The installation machine in this embodiment makes use of an electrically conductive, malleable rivet connector element, the preferred structure of which is illustrated in FIGS. 2*a* and 2*b*. Connector 4 consists of a thin, disc-shaped flange, or base, 5 and a vertical post 6. Post 6 as well as connector 4 are hollow. The opening, or hollow, in the flange and the post are of equal diameters. Post 6 has a tapered wall at its end opposite the flange. The tapered portion 7 slopes from the top of the post to the outside wall thereof. This tapered feature is designed to assist a suitable puncturing of the conductor cable during the connection procedure, a process that is described in more detail below. The degree of taper of the connector post is not critical, although some degree of taper is required for functioning of the installation process. A preferred degree of taper is about 45 degrees from the vertical. The dimensions of the connector are not critical, per se, however, a preferred range of dimensions works best once one has selected specific types of conducting elements to connect. These dimensions and the general description of the connection arrangement are described in a co-pending U.S. Pat. application Ser. No. 716,600 filed Mar. 27, 1985, now U.S. Pat. No. 4,630,362, which is a continuation of U.S. Pat. application Ser. No. 314,966 filed Oct. 26, 1981, now abandoned, effectively, filed of even date assigned to Burndy Corporation Docket Number IS/9136A. The entire contents of the latter patent application are hereby expressly incorporated herein by reference.

The material of construction of the connector is compressible, or malleable, on the application of force in order to be cold formable into the eyelet shape desired at the end of the procedure. Additionally, the connector material is preferably electrically conductive to approximately the same extent as the conductivity of metal strips 1. The most direct way of matching the conductivities is to use the same materials for both components. For instance, if the conductor of the cable is copper the connector can be made of copper or a copper alloy. The surface of the connector can be coated with a suitable lubricant to enhance the connecting procedure, reduce or eliminate any tendency for the connector to adhere to the anvil means and ease the removal of the completed connector from the anvil means.

Figure 3A:
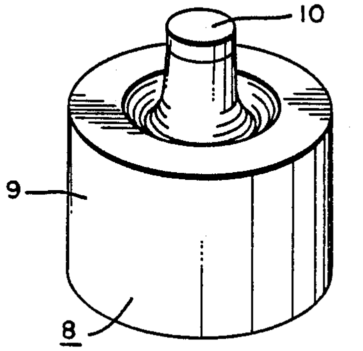
FIG. 3*a* is a front perspective view of a preferred embodiment of the anvil means.
Figure 3B:
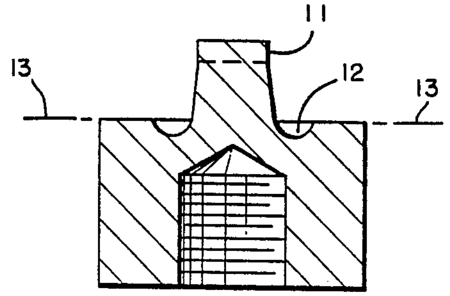
FIG. 3*b* is a front cross-section view of the anvil means shown in FIG. 3*a*.

FIGS. 3*a* and 3*b* illustrate the anvil means used to install the connector onto a flat conductor cable. The shape and construction of the anvil means is important for the proper functioning of the installation tool. Anvil 8 is comprises of a high pressure resistant material, such as polished steel. The relative motion which occurs between connector 4 and anvil 8 causes the connector to be formed into the final desired shape. In a preferred compressing device, anvil means 8 is held stationary with respect to the movement of the compressing means, or ram, and connector. However, it is not crucial to the installation tool which of the connector or anvil means moves with respect to the other. It is the relative movement between the two which is important.

Anvil 8 consists of a relatively disc-like base 9 to which is attached a generally vertical post or stud 10. The upper portion 11 of post 10 is perpendicular with respect to the base and the post thereafter is gently tapered outward until it reaches the base. At that point, the post opens up a curved circular well 12 formed in the base. Specifically referring to FIG. 3*b*, line 13—13 represents the top surface of anvil base 9 and is shown passing over well 12 through post 10 for purposes of reference. It is seen that well 12 is generally U-shaped and surrounds post 10 where it is connected to base 9. The purpose of the slight outward tapering of anvil post 10, which occurs below upper portion 11 is to force the malleable rivet post placed thereover to expand in an outward direction as the top of the rivet post reaches well 12. At this point it begins to expand further outward and around the puncture made in the flat conductor cable.

As with the dimensions of rivet connector 4, the dimensions of the anvil means are not crucial in and of themselves. They depend in large measure upon the materials and parameters of the conducting cable selected to be joined and the compressing forces to be used to effect puncture and connection. Examples of materials and dimensions that can be used for these components is in the co-filed application mentioned above.

Figure 4:
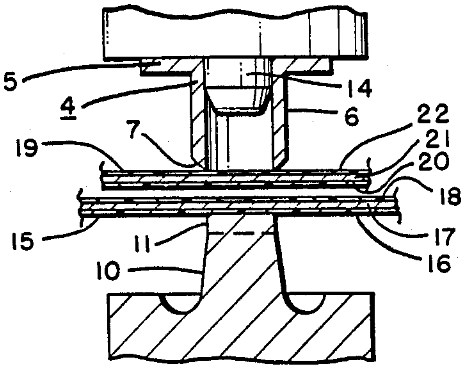
FIG. 4 is a schematic illustration of the anvil means, connector, ram and flat conductor cable just prior to the beginning to the installation process.

The sequence of cable puncturing and electro-mechanical fixation of the connector is described with reference to FIGS. 4–7. Referring to FIG. 4, ram 14 holds rivet connector 4 of anvil means 8 such that post 6 of the rivet is perfectly concentric with post 10 of anvil 8. Resting on top of the anvil, for purposes of this illustration, are portions of two flat conductor cables which are to be electrically connected by rivet connector 4. Both portions of the two cables contain, of course, a conductive metal strip, since the object is to electro-mechanically connect the two cables. The portion of flat conductor cable 15, resting immediately on anvil 8, comprises a bottom plastic insulated layer 16, a layer of copper 17 and a top layer of insulating plastic 18. Directly above cable 15 is another flat conductor cable 19, immediately over the anvil having a bottom plastic layer 20, adjacent plastic layer 18, a middle copper strip 21 and an upper plastic layer 22.

Figure 5:
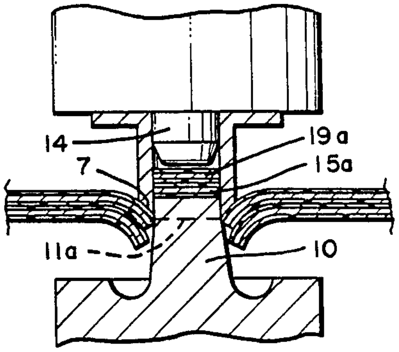
FIG. 5 is a schematic illustration of the same members shown in FIG. 4 just after the cable puncture phase of the installation process has been accomplished.

Referring now to FIG. 5, ram 14 of the compressing means has moved rivet connector 4 down forceably against cables 15 and 19. In so doing, post 6 of rivet connecto 4 has passed over the top of post 10 and anvil 8. Since the inner diameter of the rivet post is slightly larger than the diameter of the upper portion of the anvil post, this swift downward action results in a rupturing of cables 15 and 19 due to the combined forces of tapered edge 7 of rivet post 6 and the resistance fit between the rivet post and anvil post.

Figure 6:
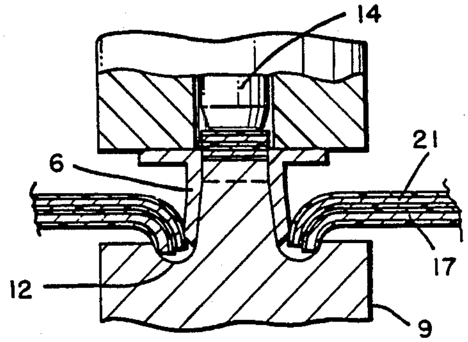
FIG. 6 is a schematic illustration of the same members shown in FIG. 4 just after the initiation of cold forming which forms the eyelet configuration on the connector post.

Referring now to FIG. 6, as the downward stroke of the compression means continues, the leading edge of post 6 enters the tapered area of post 8 and is spread outward as a result thereof. As the leading edge continues further downward and encounters well 12, cold forming of post 6, as defined by the shape of the well, commences.

Figure 7:
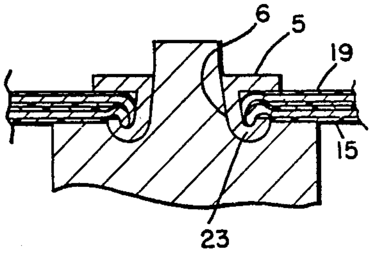
FIG. 7 is a schematic illustraton of the same members shown in FIG. 4 after the connector has been completely installed on the flat conductor cable.

Referring now to FIG. 7, the compression stroke continues to the end and forces the post of the rivet connector to cold form into a round eyelet shape. The post end curls under, around and up to clinch the cable sandwich on the underside of cable 15 against plastic insulating layer 16, in the direction of the flange 5. The other side of the cable sandwich is tightly secured by rivet flange 5. As a result, the eyelet portion 23 and flange 5 form a pinch clamp to mechanically secure the connection. It can be clearly seen from FIG. 7 that the conductive strips 17 and 21 are in intimate contact with the inside of the eyelet 23, thus ensuring a good electrical connection. It has been found that a compression force of between 2500 lbs. and 3500 lbs. produces excellent results.

Figure 8A:
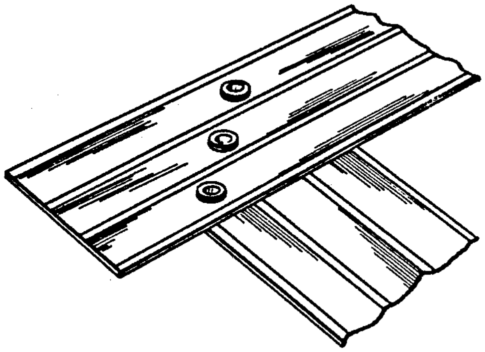
FIG. 8*a* is a perspective view of the finished cable connection from the flange side of the connector.
Figure 8B:
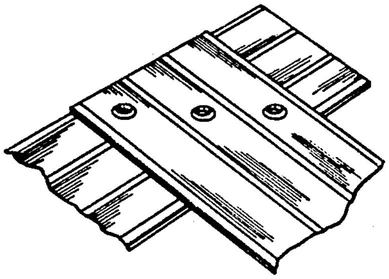
FIG. 8*b* is a perspective view of the finished cable connection from the eyelet side of the connector.

Referring to FIG. 8*a*, a finished connection of two flat conductor cables is illustrated looking onto the flange side of the connector. FIG. 8*b* illustrates the cable connection looking from the other side of the cable; that is, the eyelet side of the connector. As can be appreciated, a sturdy electro-mechanical clamping relationship is created.

Figure 9:
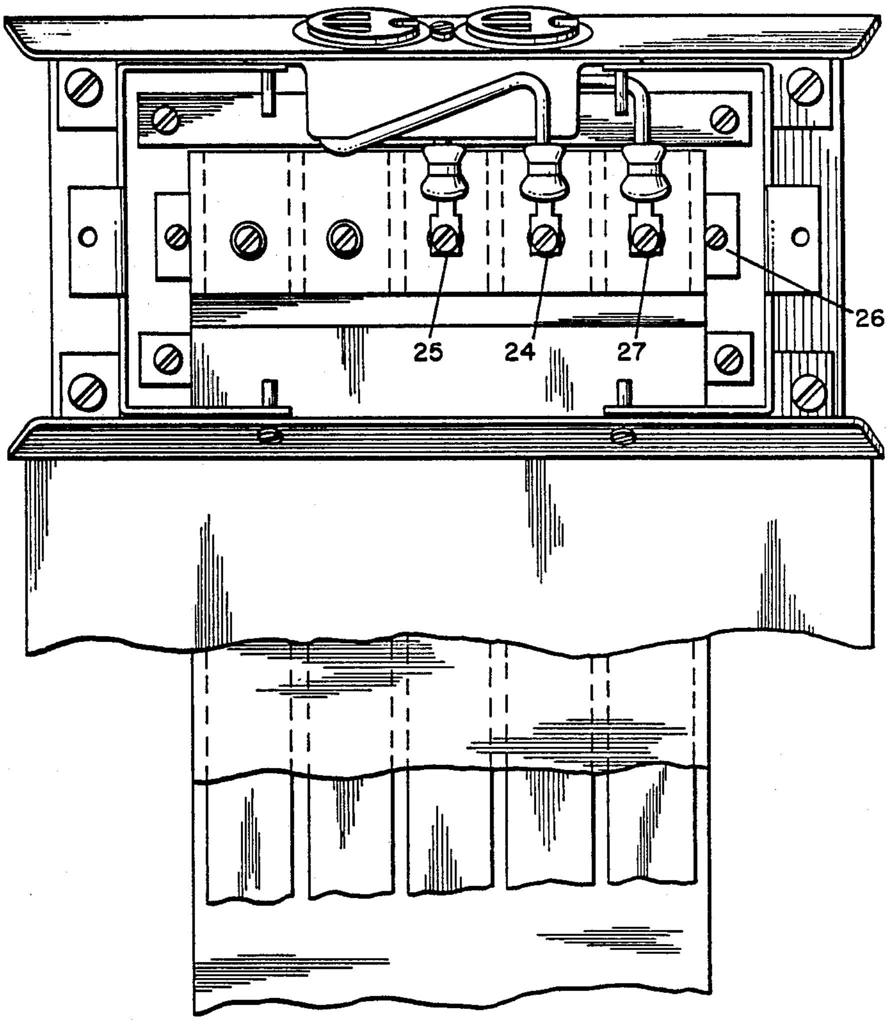
FIG. 9 illustrates the cable connection in use with a terminal fitting.

Although the connection arrangement and method is described with respect to the joining of two flat conductor cables, such as occurs in cable tapping or cable splicing, this invention also embraces terminal or transition fittings. Normally, the rivet connector is driven through and clamps the top and bottom portions of a single flat conductor cable in transition fittings. A terminal or transition connection is then assembled as shown in FIG. 9 by inserting proper sized screws 24 through the connector openings 25 and into a suitable insulating holding bar 26. Then, for example, lugs 27 from an electrical outlet are placed between the screw and flange portion of the connector to achieve the transition or terminal connection.

Figure 10:
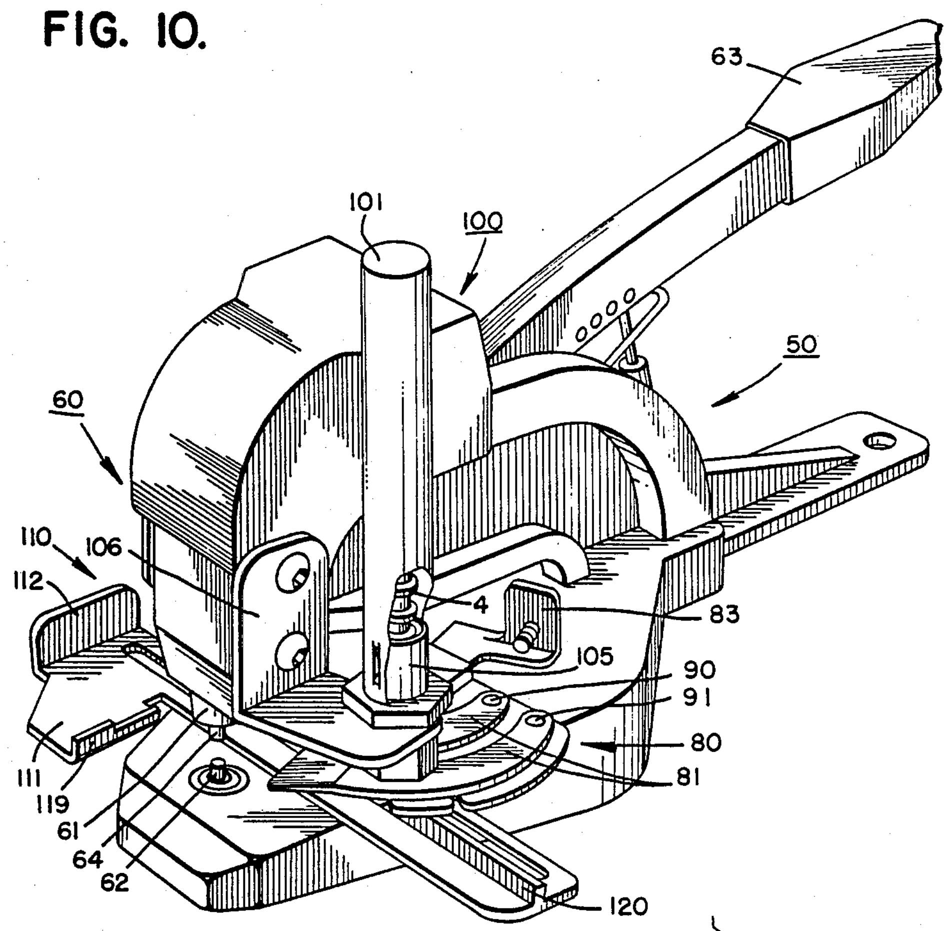
FIG. 10 is a perspective view of the installation machine.

Attention is now drawn to the series of FIGS. 10–19, which depict the machine or tool used for installing flat conductor cable connectors. Referring to FIG. 10, there is shown a perspective of the connector installation machine. The apparatus, which is hand-operated, includes several subsystems which is hand-operated, includes several subsystems which are mounted on frame 50. These include press 60, transfer mechanism 80, supply of connectors 100 and locator assembly 110.

The supply of connectors is magazine-loaded so that the connectors can be delivered to the transfer mechanism one at a time. The transfer mechanism, after removing the connector from the supply, aligns the connector with ram 61. An operator places the portion of the flat conductor cable, which has been predetermined to have the connector attached thereto, on anvil 62 below ram 61. Locator assembly 110, when appropriate, serves to locate the flat conductor cable in precisely the right position to have the connector attached to its conductor such as one making up an end connection. The press is then activated by the operator pushing on press handle 63 which forces ram 61, and the connector loaded thereon, down onto the flat conductor cable to make a connection therewith in one continuous action. The connector applied to the flat conductor cable in this fashion punches through the flat conductor cable and mechanically secures itself thereto.

Figure 19:
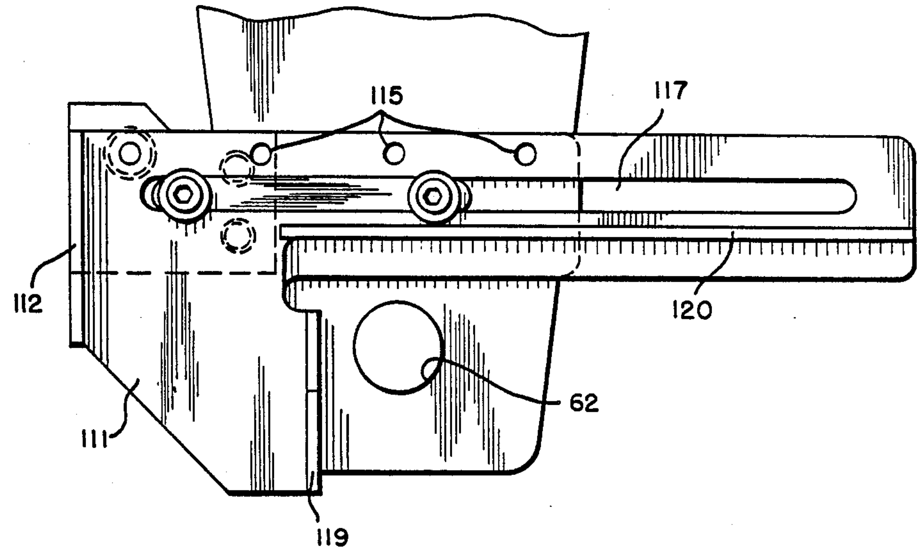
FIG. 19 is a top view of the locator assembly showing it mounted on the machine.

Locator assembly 110 is shown in detail in FIGS. 18 and 19. FIG. 18 is a perspective view of the assembly, while FIG. 19 is a top view showing it mounted on the apparatus. The function of the locator assembly is to serve as an aid to quickly place the approximate centerline of the conductive strips of the flat conductor cable on the anvil. Flat conductor cable is manufactured for several applications and can contain any number of parallel conductive strips. It is generally necessary to make connections to all of the strips and by providing a slideable locator assembly with detent positions corresponding to placing each conductive strip on the anvil, the process of making connections is speeded up with the apparatus. The locator assembly accurately positions the cable conductors so that the connector is instaled in the appropriate location to mate with the spacing of the terminal, or transition, block electrical connectors.

The locator assembly includes locator plate 111 which is mountedon locator plate mounting base 113. Base 113, mounted on frame 50, is attached to locate plate 111 through a detent (shown in FIG. 19), which interacts with mounting detent holes 115. Locator plate 111 can be selectably moved by push tab 112 relative to mounting base 113 so that a multitude of positions can be attained. Bar 117, which is mounted on the machine frame with screws, interacts with slot 118 enabling the locator plate to move relative to the frame. The positions are located through position detent 114 which interacts with detent holes 115 on the locator plate. Holes 115 are located so that when the operator places a flat conductor cable onto the locator plate with one edge resting against side guide 119 and the cable forward edge resting on front guide 120, he can move the plate to the various positions interacting with detent 114. Each position corresponds to placing a different conductive strip of the cable over the anvil. The detent positions can be made adjustable to the type of cables being used. The locator assembly has been found to be most useful in transition connectors and can be detached from the frame of the machine when appropriate such as when cable splices and cable taps are being connected.

Figure 17:
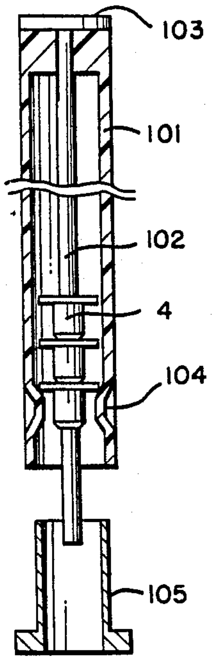
FIG. 17 is a side sectional view of the supply tube and feed tube.

FIG. 17 can be referred to for additional detail on the connector supply. FIG. 17 is a side view of the supply magazine. The machine has permanently mounted to it through mounting plate 106 a feed tube 105 which is adapted to receive connectors from the magazine and feed them to the transfer mechanism. Connectors are supplied to the feed tube in a column contained by supply tube 101. Connectors 4 are oriented in the column so that their non-flanged end drops into the feed tube and transfer mechanism first. The connectors are held in alignment in the supply tube by guide rod 102 which, in turn, is held on the tube by holder 103.

The operator places a preloaded magazine, open end first, onto feed tube 105. Supply tube 101 contains a series of ribs 104 which hold the connectors within the tube before the tube is placed on feed tube 105. As supply tube 101 is inserted onto feed tube 105, the shape of the feed tube spreads out the ribs of the supply tube thereby allowing connectors to drop into the feed tube. The feed tube is mounted onto the frame of the machine.

FIGS. 12-16 can be referred to for details of the transfer mechanism. The function of the transfer mechanism is to receive connectors one at a time from the supply tube and relocate the connector in alignment with the ram and load the connector onto the ram. The transfer mechanism includes a pair of movable jaws 81 which are mounted on movable carry plate 82. The carry plate/jaws are moved by the operator grasping the transfer mechanism handle 83 and moving the carry plate/jaws towards the press. The jaws move in an arc about pivot 84, but are biased to the position shown in FIG. 14 by torsion spring 85 which is located around pivot 84. The jaws are centered in their arcuate movement about pivot 84 by centering member 86 located on the carry plate. Member 86 is stationary in the channel between jaws 81. The movement of the jaws is limited by stops 93 and 94 which are adjustable.

Figure 14:
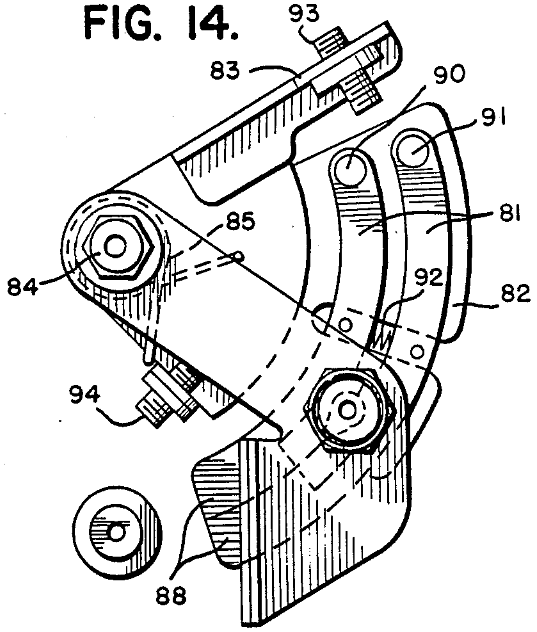
FIG. 14 is a top view of the transfer mechanism shown in the position to which it is biased, or home position, whereat connectors can be placed onto the transfer mechanism from the supply.

The full cycle of the transfer mechanism is as follows. In the biased, or home position, shown in FIG. 14, the transfer mechanism receives a connector. The jaws of the transfer mechanism contain a recessed receiving pocket, or connector receiving means, for holding the connector during the transfer process. As the jaws are returned to the position shown in FIG. 14 during the previous cycle, pocket 87 is empty. When the pocket reaches the position just underneath the supply tube, as shown in FIG. 14, there is room for one connector to drop out of the feed tube into the connector pocket. Since the level of the top surface of the jaws is flush with the top surface of the connector in the pocket, further connectors cannot drop into the transfer mechanism until the transfer mechanism has been again cycled and becomes empty.

Figure 15:
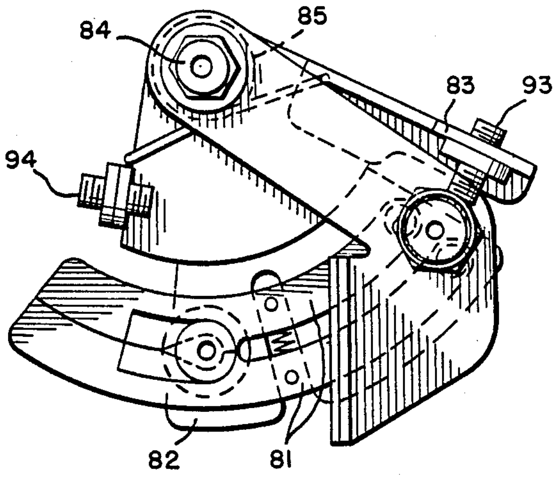
FIG. 15 is the same mechanism shown in FIG. 14 with the mechanism in the position whereat connectors are loaded onto the ram.

To accomplish the transfer process, the operator pulls handle 83 bringing the transfer mechanism in a clockwise direction to the position shown in FIG. 15. FIG. 15 shows the connector being brought into alignment with the ram, anvil and portion of the flat conductor cable that is to have a connector attached thereto. This forms an installation station. Leading edge portion 88 of the jaws, is in a ramp configuration. The purpose of this ramp is discussed below in conjunction with the press.

Once the position is obtained by the transfer mechanism as shown in FIG. 15 and the connector is loaded onto the ram and held thereby, the operator releases handle 83 and spring 85 automatically returns the transfer mechanism to the position shown in FIG. 14. The jaws are allowed to release the connector and return to the home position by virtue of the configuration or profile 89 of the jaws adjacent the pocket. As the transfer mechanism begins to return to its home position, the connector, which is now held by the ram, provides an obstacle.

Profile 89 is made such that the jaws open relative to one another and allow themselves to ease by the connector. The pocket has a teardrop-shaped opening to receive the connector post and an upper U-shaped channel to accommodate the connector flange. The opening and channel provide surfaces adjacent the connector which enables the jaws to be cammed away from the connector as the transfer mechanism returns home. The jaws pivot about pins 90 and 91, respectively, which enable them to open up and allow clearance for the connector as the transfer mechanism is returned. Pins 90 and 91 are mounted in the carry plate. The jaws are biased in the closed position by spring 92 which enables the jaws to return to their closed position before the pocket reaches the supply tube at its home position. The jaws, when closed enable the pocket to hold the connector on the transfer means. The jaws, when open, enable the connector to be removed from the pocket and remain with the ram.

Figure 11:
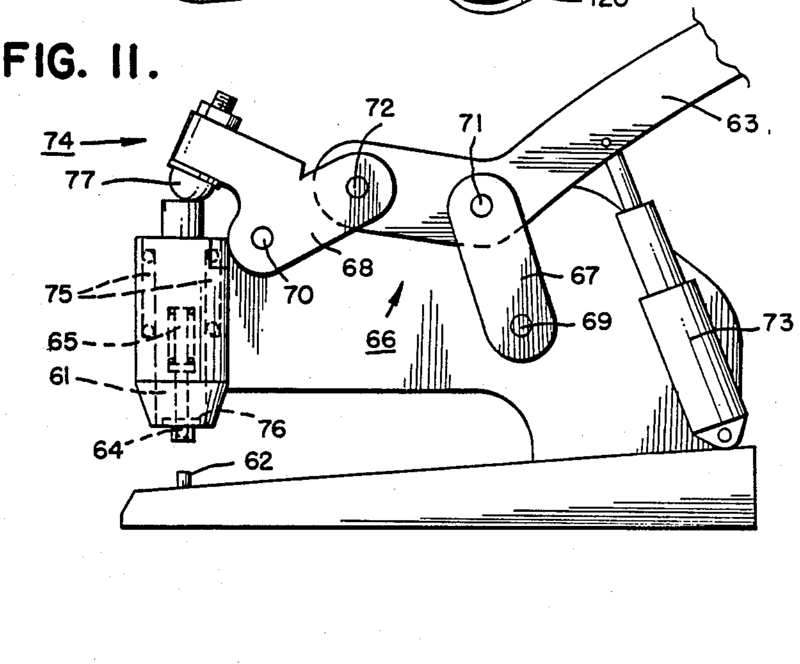
FIG. 11 is a diagramatic side view of the installation machine showing the ram and linkage.
Figure 12:
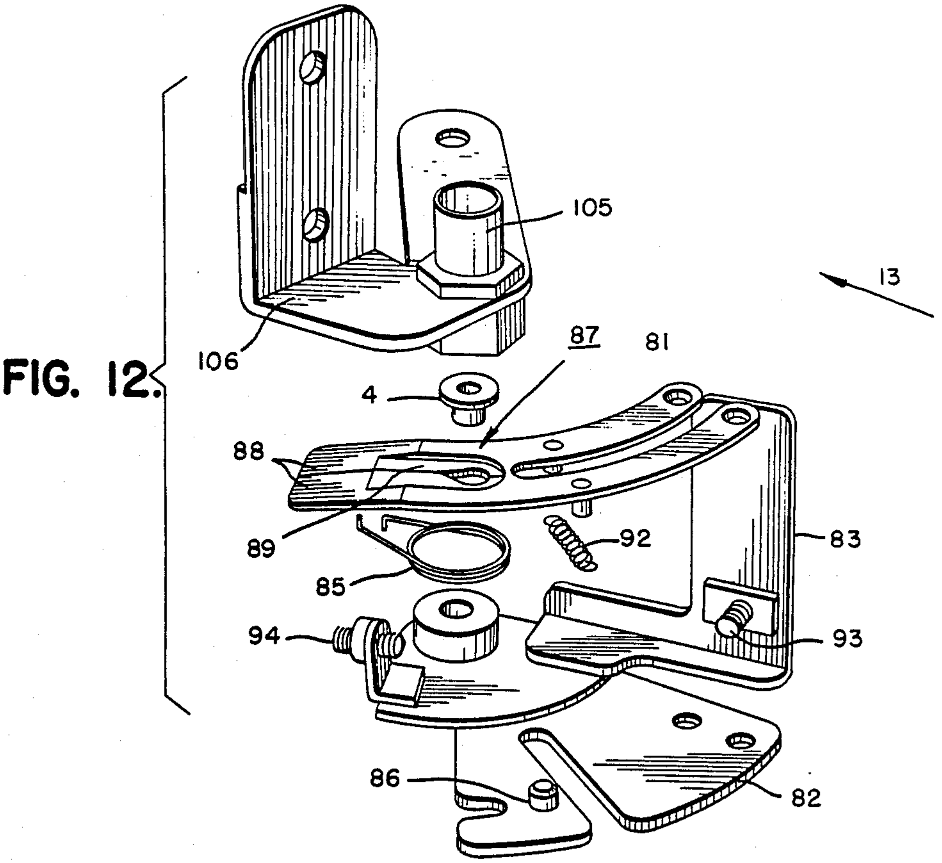
FIG. 12 is an exploded view of the transfer mechanism.
Figure 13:
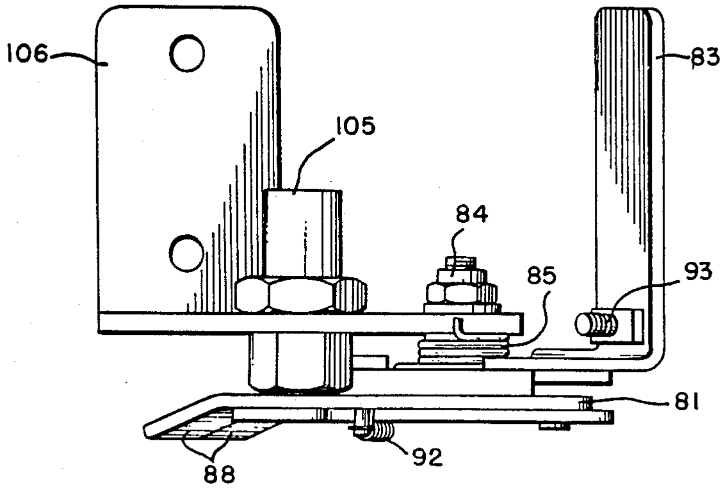
FIG. 13 is a side view of the mechanism in FIG. 12 taken along arrow 13.

FIG. 11 is referred to for additional detail on the press. The function of the press is to be a force applying mechanism on the connector to accomplish its mechanical and electrical joining with the conductor portion of the flat conductor cable. The press includes a movable ram 61 and a fixed anvil 62. Ram 61 has a recess 76 which captures the flange on the connector. The function of the recess is to prevent the extrusion of the flange during the power stroke of the ram. Guide pin 64, is located in the center of the ram. The purpose of the pin is to retain the connector on the ram until it has been installed onto the cable and also to align the connector with the anvil. Guide pin 64 is allowed to retract up into the ram. The guide pins normal position, however, is fully extended from the ram due to spring 65.

Guide pin 64 receives the connector from the pocket of the transfer mechanism and retains the connector thereon until the connection has been made. The retractability feature of the guide pin, as well as its rounded or tapered portion that faces the anivil, plays a major role in loading the connector onto the ram. As described above, the transfer mechanism jaws have ramp-like profile 88 just ahead of the recessed portion of the jaws that contains the connector. As the transfer mechanism approaches the position where the connector is to be loaded onto the ram, FIG. 15, the ramp portion of the jaws contacts guide pin 64. Due to the ramp profile, pin 64 retracts up into the ram. Eventually as the transfer mechanism gets closer to reaching its full stroke, the pin rides up over the ramp, over the leading edge of the connector and drops into the hollow or opening in the flange and post of the connector. At this point the transfer mechanism has completed its stroke and the connector is loaded onto the ram. Once it is aligned with the opening in the connector, pin 64 drops back to its unretracted position. The transfer mechanism then returns to its home position, the jaws cam out around the connector to open up, and the connector is aligned in the installation station so that it can be installed onto the cable.

The ram is operably supported within the frame of the machine and is driven by a linkage generally designated as 66. The linkage contains two links, 67 and 68, which, in turn, have two fixed pivot points, 71 and 72 respectively. The two movable points are connected to handle 63 which is activated by the operator. The linkage is designed so that as the operator pushes down on the handle a force is applied to the ram causing it to close on the anvil through force transmitter 74. The ram is biased in its upper-most position by spring 75 which returns the ram to its normal position after the connection is made. Full cycle assurance during the connection process is provided by ratchet mechanism 73 which is connected between the machine frame and handle 73. The ratchet assures that once a press cycle is undertaken it must continue through its full stroke before the handle is allowed to return to its normal upper position. The press is designed to apply 4000 lbs. per square inch on the connector, however, substantially less force is required to complete the connection.

The amount of stroke that the ram takes, and, thus, the amount of thickness and degree of clinching that the connector makes on the cable can be adjusted through changing the position of the force transmitter contact member 77. This dimension is generally optimized for the particular size connector that is used. The electrical resistance of the connection is inversely proportional, to a point, to the retention force on the connector after installation. Once the optimized dimension is arrived at for a given connector, the stroke of the ram is set to the optimized dimension. The apparatus maintains this dimension within very close tolerances thereby reliably and repeatably producing the optimized installed dimension connection after connection.

Anvil 62 is fully described in the first part of this application as is the process by which the connection is made. The anvil is mounted on the frame of the machine in alignment with the ram. The configuration of the connector has also been described as has the function of the tapered wall on its non-flanged end which carries out the puncture or cutting action on the flat conductor cable as installation occurs.

The manner in which an operator uses the mechanism to effect an end connection, such as to accommodate a transition box mating connection, is quite straight forward. The locator plate is set at the right spacing and the operator places the flat conductor cable against the locator's side plate and front guide to align the conductor to the insulaton station. The operator, with one hand, grasps the transfer mechanism handle and rotates the transfer mechanism to load a connector onto the ram. He then presses down on the press handle to make the connection.

As the transfer mechanism handle is rotated, it swings the connector already existing in its pocket to the ram area. The connector guide pin is guided up over the transfer mechanism and connector and drops into the opening in the connector. The operator releases the transfer mechanism and the torsion spring drives it back to its home position. During this latter step, the connector is being held in place by the connector guide pin and the transfer mechanism jaws cam around the connector as the mechanism returns to its home position.

FIG. 16 shows the transfer mechanism partially returned to the position to which it is biased with its jaws partially closed. As the transfer mechanism reaches its home position, the next connector drops from its supply tube into the pocket in the transfer mechanism in preparation for the next cycle. Meanwhile, the connector is held by the ram over and in alignment with the cable and anvil. The operator, upon activating the press handle, causes the ram and the connector, which is held by it, to be driven down onto the anvil to make the connection with the cable. After the press handle is fully depressed by the operator, the ram is allowed to retract to its home position bringing the connector guide pin with it and removing it from the connector.

Other types of joints are made with flat cable connectors such as splices and taps. In both of these cases, the locator assembly is generally removed from the mechanism and a template is used to site the location on the cable where the connection is to be made. However, in both of these cases, the same type of connector and machine operation is used to make a connection as described in connection with the transition box mating connector.

The installation machine described above accomplishes a strong electrical and mechanical connection between the flat conductor cable and connector. The device is portable and the process of making a connection is exactly repeatable so that reliable connections can be made everytime. The actual installation step occurs in one continuous, quick, easy action. The installation machine, and the connectors used therewith, provide a universal system for all applications of connectors onto flat conductor cable.

It should be understood that the foregoing description is only illustrative of the invention. Various alternatives and modifications of the structural and functional features of the installation apparatus can be devised by those skilled in the art without departing from the invention. Accordingly, the present invention is intended to embrace all such alternatives, modifications and variances which fall within the spirit and scope of the appended claims.

What is claimed is:

1. A method of installing connectors onto flat conductor cables having a plurality of spaced conductors comprising:

(a) providing a supply of one piece connectors, each of the connectors being formed of an electrically conductive material and being of a one piece construction;

(b) locating a predetermined one of the conductors of the flat conductor cable at an installation station by positioning the flat conductor cable against a guide operably supported at the installation station and engageable by the edge of the flat conductor cable;

(c) removing a single connector from the supply;

(d) transferring the removed connector from the supply to the installation station by means of a transfer means comprising jaws closing about the connector and forming a pocket to hold the connector with the transfer means and aligning the single connector with the predetermined conductor;

(e) releasing the transferred connector from the transfer means at the installation station; and (f) pressing the single connector into the flat conductor cable and into physical contact and electrical contact with the predetermined conductor, said pressing being effected by the relative movement between an anvil and a ram for moving the single connector through the flat conductor cable and predetermined conductor and into contact with the fixed anvil whereby the single connector is deformed into the flat conductor cable so that the connector is secured to the flat conductor cable and predetermined conductor and electrical current can pass from the predetermined conductor to the connector.

2. The method as set forth in claim 1 wherein the guide is slideably locatable at more than one position relative to the installation station and further including the step of adjusting the guide with respect to the installation station whereby the operator can select which conductor in the flat conductor cable is to be placed at the installation station.

3. The method as set forth in claim 1 wherein said pressing is effected by moving the ram with respect to the anvil.

4. A method as in claim 1 wherein the step of transferring the removed connector is along an arced path.

5. A method as in claim 1 wherein the step of pressing comprises the anvil having a guide pin which engages with an opening of the connector.

6. A method for installing cylindrical connectors onto flat conductor cables comprising:

providing a supply of connectors;

locating a predetermined portion of a flat conductor cable at an installation station;

removing a connector from the supply;

transferring the removed connector from the supply to the installation station by movement radially with respect to the connector;

releasing the transferred connector at the installation station;

aligning the connector with the predetermined portion of the flat conductor cable; and pressing the connector into the flat conductor cable by a ram movable with respect to a fixed anvil whereby electrical current can pass from the flat conductor cable to the conductor.

7. A method of installing a rivet connector, the connector having a post, flange and an opening therein, onto a flat conductor cable comprising:

(a) providing a supply of connectors;

(b) locating a predetermined portion of the flat conductor cable at an installation station remote from the supply;

(c) pressing the connector into and through the flat conductor cable at the installation station, the pressing being effected by relative motion between a ram and anvil, the ram including a guide pin which is engageable with the opening of the connector;

(d) removing the connector from the supply and aligning the opening of the connector with the guide pin; and (e) causing relative movement between the ram and the anvil to press the connector into the portion of the flat conductor cable at the installation station.

8. The method as set forth in claim 7 wherein the anvil is fixed and the pressing is effected by moving the ram with respect to the anvil.

9. The method as set forth in claim 8 and further including the step of retaining the connector in association with the ram by the guide pin until the connector is connected to the flat conductor cable.

10. The method as set forth in claim 9 wherein the removing of the connector from the supply and its aligning with the ram is effected by a transfer means which includes a recessed receiving pocket for the connector, and further including the step of moving the transfer means to alternately place the pocket adjacent the supply and the ram.

11. The method as set forth in claim 10 wherein the transfer means includes jaws closable to enable the pocket to hold the connector on the transfer means and openable to enable the connector to be removed from the pocket, and further including the step of opening the jaws when a connector, located in the pocket, has the guide pin engaged with the opening in the connector.

12. The method as set forth in claim 11 wherein the guide pin is retractable into the ram and is biased to remain unretracted, and the transfer means includes a ramp which forces the guide pin to retract sufficiently to ride over the transfer means and connector as the transfer means moves the connector towards the ram to be loaded thereon.

* * * * *